US012737344B2

(12) United States Patent
Yin et al.

(10) Patent No.: US 12,737,344 B2
(45) Date of Patent: Sep. 15, 2026

(54) DETECTION OF CONFLICTS IN MULTI-MODAL DOCUMENT-BASED LLM

(71) Applicant: International Business Machines Corporation, Armonk, NY (US)

(72) Inventors: Kun Yan Yin, Ningbo (CN); Jing Zhang, Shanghai (CN); Yuan Yuan Ding, Shanghai (CN); Shi Yun Liang, Shanghai (CN); Yu Pan, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/952,303

(22) Filed: Nov. 19, 2024

(65) Prior Publication Data

US 2026/0140935 A1 May 21, 2026

(51) Int. Cl.
*G06F 16/00* (2019.01)
*G06F 16/22* (2019.01)
*G06F 16/23* (2019.01)

(52) U.S. Cl.
CPC .......... *G06F 16/23* (2019.01); *G06F 16/2237* (2019.01)

(58) Field of Classification Search
CPC ................. G06F 16/285; G06F 16/215; G06F 16/24578; G06F 16/951; G06F 40/166; G06F 40/247; G06F 40/30; G06F 30/13; G06F 30/27; G06F 30/15; G06F 30/20; G06F 40/186; G06F 40/274; H04L 63/107; H04L 63/1425; H04W 12/63;
(Continued)

(56) References Cited

U.S. PATENT DOCUMENTS 10,553,202 B2 2/2020 Amid et al.
2023/0396641 A1* 12/2023 Hebbagodi ......... H04L 63/1408
(Continued)

FOREIGN PATENT DOCUMENTS

CN 118093604 A 5/2024

OTHER PUBLICATIONS

Chen et al. "Rich Knowledge Sources Bring Complex Knowledge Conflicts: Recalibrating Models to Reflect Conflicting Evidence", Department of Computer Science, The University of Texas at Austin, Dec. 7-11, 2022, pp. 2292-2307.
(Continued)

*Primary Examiner* — Shyue Jiunn Hwa
(74) *Attorney, Agent, or Firm* — Yee & Associates, P.C.

(57) ABSTRACT

A computer implemented method for conflict detection and data storage in a vector database. A processor set receives documents and splits the documents into a plurality of chunks. The processor set embeds the chunks and converts the chunks into numerical vector representations and performs a similarity check by comparing the vectors of the embedded chunks with vectors of existing chunks stored in the vector database. If no similarity is identified between the vectors of the embedded chunks and the vectors of existing chunks stored in the vector database, the processor set stores the embedded chunks in the vector database. If a similarity is identified, the processor set initiates a conflict detection check. If no conflict is identified, the processor set stores the embedded chunks in the vector database. If a conflict is identified, the processor set initiates a conflict resolution.

20 Claims, 8 Drawing Sheets

(58) Field of Classification Search
CPC ............... G06Q 30/0283; G06Q 50/08; G06Q 30/0205; G06Q 30/0244; G06Q 30/0269; G06Q 30/0276; G06V 30/413; G06V 30/416; G06V 30/422; G06V 10/82; G06N 3/045; G06N 3/048; G06N 3/08; G06N 3/084
See application file for complete search history.

(56) References Cited

U.S. PATENT DOCUMENTS

| | | | | |
|---|---|---|---|---|
| 2024/0281487 | A1 | 8/2024 | Bathwal et al. | |
| 2025/0045256 | A1* | 2/2025 | Gottlob | G06F 16/211 |
| 2025/0053735 | A1* | 2/2025 | Shevchenko | G06F 40/30 |
| 2025/0077487 | A1* | 3/2025 | Groenewegen | G06F 16/215 |

OTHER PUBLICATIONS

Disclosed Anonymously, IP.com No. IPCOM000274594D "Document Retrieval System Using the Content of Text, Images, and Tables Extracted by Generative AI", Jun. 17, 2024, 4 pages.

Longpre et al. "Entity-Based Knowledge Conflicts in Question Answering", arXiv:2109.05052v2 [cs.CL], Jan. 12, 2022, 12 pages.

Wang et al. "Resolving Knowledge Conflicts in Large Language Models", arXiv:2310.00935v1 [cs.CL], Oct. 2, 2023, 28 pages.

Xie et al. "Adaptive Chameleon or Stubborn Sloth: Revealing the Behavior of Large Language Models in Knowledge Conflicts", arXiv:2305.13300v4 [cs.CL], Feb. 27, 2024, 24 pages.

Zhang et al. "Using Pre-trained Language Models to Resolve Textual and Semantic Merge Conflicts (Experience Paper)", Using Pre-trained Language Models to Resolve Textual and Semantic Merge Conflicts (Experience Paper), Jul. 18-22, 2022, pp. 77-88.

* cited by examiner

DETECTION OF CONFLICTS IN MULTI-MODAL DOCUMENT-BASED LLM

BACKGROUND

The present disclosure relates generally to artificial intelligence (AI), and more specifically to conflict detection in multi-modal document-based large language models (LLMs).

LLMs are AI models trained on large amounts of data. LLMs are designed to understand, generate, and manipulate human language. They are able to perform tasks such as answering questions, summarizing text, translating languages, and generating creative content.

Retrieval-Augmented Generation (RAG) is a technique that combines LLMs with a retrieval mechanism. In knowledge-based Q&A systems, RAG typically works by preprocessing, retrieval and contextualization. During preprocessing, a large knowledge base is broken down into smaller, manageable chunks. When a user asks a question, a RAG-based system retrieves relevant chunks from the knowledge base using methods like embedding (e.g., converting chunks into vector form). The retrieved chunks are provided as context to the LLM, which uses them to generate an answer to the user's question.

SUMMARY

According to an illustrative embodiment, a computer-implemented method for conflict detection and data storage in a vector database is provided. A processor set receives documents and splits the documents into a plurality of chunks. The processor set embeds the chunks and converts the chunks into numerical vector representations. The processor set performs a similarity check by comparing the vectors of the embedded chunks with vectors of existing chunks stored in the vector database. If no similarity is identified between the vectors of the embedded chunks and the vectors of existing chunks stored in the vector database, the processor set stores the embedded chunks in the vector database. If a similarity is identified, the processor set initiates a conflict detection check. If no conflict is identified, the processor set stores the embedded chunks in the vector database and if a conflict is identified, the processor set initiates a conflict resolution. According to other illustrative embodiments, a computer system and a computer program product for conflict detection and data storage in a vector database are provided.

DETAILED DESCRIPTION

Figure 1:
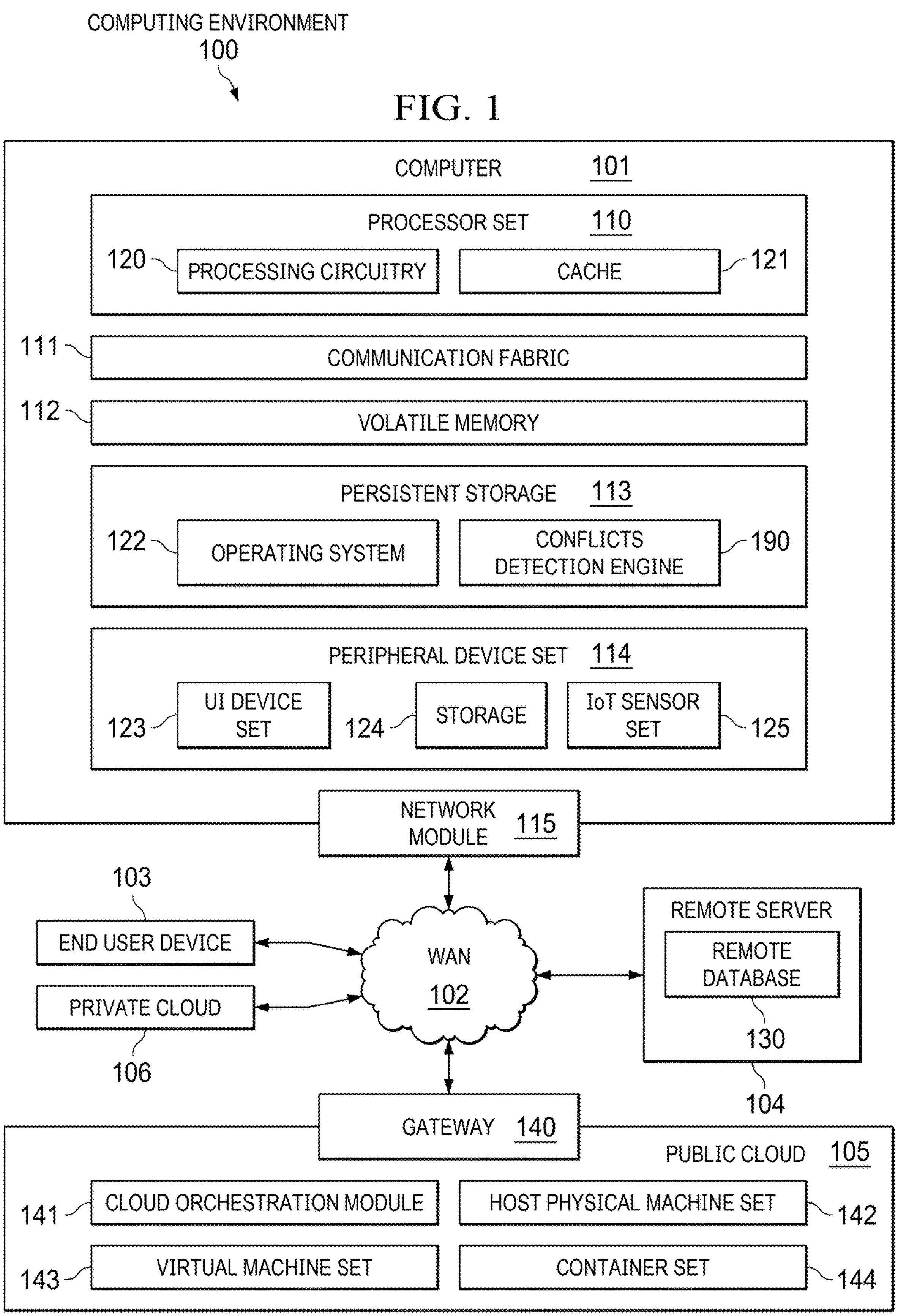
FIG. 1 is a pictorial representation of a computing environment in which illustrative embodiments may be implemented.

A computer-implemented method detects conflicts during data storage in a vector database. A processor set receives documents and splits the documents into a plurality of chunks. The processor set embeds the chunks and converts the chunks into numerical vector representations and performs a similarity check by comparing the vectors of the embedded chunks with vectors of existing chunks stored in the vector database. If no similarity is identified between the vectors of the embedded chunks and the vectors of existing chunks stored in the vector database, the processor set stores the embedded chunks in the vector database. As a result, the illustrative embodiments provide a technical effect of improving the accuracy of the data in the vector database by storing documents that are not similar, thus reducing the likelihood of storing conflicting information from similar documents in the vector database.

In the illustrative embodiments, the processor set initiates a conflict detection check if a similarity is identified. If no conflict is identified, the processor set stores the embedded chunks in the vector database. As a result, the illustrative embodiments provide a technical effect of improving the accuracy of data stored in the vector database by storing documents that do not contain conflicting information.

In the illustrative embodiments, the processor set initiates a conflict resolution if a conflict is identified. As a result, the illustrative embodiments provide a technical effect of improving the accuracy of data stored in the vector database by resolving or verifying any conflicting information based on a conflict resolution before it is stored in the vector database.

In the illustrative embodiments, the processor set extracts event information from text within the embedded chunks and generates event knowledge graphs. The processor set extracts structure and elements from images and tables within the embedded chunks and generates structure graphs. The processor set performs conflict detection by analyzing the event knowledge graphs and structure graphs. As a result, the illustrative embodiments provide a technical effect of conflict detection by analyzing the event knowledge graphs and structure graphs.

In the illustrative embodiments, the processor set analyzes the event knowledge graphs and structure graphs using a large language model (LLM). The LLM is an AI-trained model configured to analyze the event knowledge graphs and structure graphs to detect conflicts. As a result, the illustrative embodiments provide a technical effect of conflict detection by analyzing the event knowledge graphs and structure graphs using an AI-trained model.

In the illustrative embodiments, the processor set determines if a conflict exists based on the analysis by the LLM. If no conflict is identified by the LLM, the processor set stores the embedded chunks in the vector database. As a result, the illustrative embodiments provide a technical effect of reducing conflicts and discrepancies in the data stored in the vector database using an AI-trained model.

In the illustrative embodiments, a computer system comprises a processor set, one or more computer-readable storage media, and program instructions stored on the one or more storage media to cause the processor set to perform the following operations. The processor set receives documents and splits the documents into a plurality of chunks. The processor set embeds the chunks and converts the chunks into numerical vector representations. The processor set performs a similarity check by comparing the vectors of the embedded chunks with vectors of existing chunks stored in the vector database. The processor set stores the embedded chunks in the vector database if no similarity is identified between the vectors of the embedded chunks and the vectors of existing chunks stored in the vector database. As a result, the illustrative embodiments provide a technical effect of improving the accuracy of the data in the vector database by storing documents that are not similar, thus reducing the likelihood of storing conflicting information from similar documents in the vector database.

In the illustrative embodiments, the operations further comprise initiating a conflict resolution if a similarity is identified and storing the embedded chunks in the vector database if no conflict is identified. As a result, the illustrative embodiments provide a technical effect of improving the accuracy of data stored in the vector database by storing documents that do not contain conflicting information.

In the illustrative embodiments, the operations further comprise initiating a conflict resolution if a conflict is identified. As a result, the illustrative embodiments provide a technical effect of improving the accuracy of data stored in the vector database by resolving or verifying any conflicting information based on a conflict resolution before data is stored in the vector database.

In the illustrative embodiments, the operations further comprise pre-processing the embedded chunks and generating event knowledge graphs from text and structure graphs from images or tables, and analyzing the event knowledge graphs and structure graphs to detect conflicts. As a result, the illustrative embodiments provide a technical effect of conflict detection by analyzing the event knowledge graphs and structure graphs.

In the illustrative embodiments, the operations further comprise analyzing the event knowledge graphs and structure graphs using a large language model (LLM). The LLM is an AI-trained model configured to analyze the event knowledge graphs and structure graphs to detect conflicts. As a result, the illustrative embodiments provide a technical effect of conflict detection by analyzing the event knowledge graphs and structure graphs using an AI-trained model.

In the illustrative embodiments, the operations further comprise determining if a conflict exists based on the analysis by the LLM, and storing the embedded chunks in the vector database if no conflict is identified by the LLM. As a result, the illustrative embodiments provide a technical effect of reducing conflicts and discrepancies in the data in the vector database using an AI-trained model.

In the illustrative embodiments, a computer program product comprises one or more computer-readable storage media and program instructions stored on the one or more storage media to perform the following computer operations. The program instructions are executable by a computer system to receive documents and split the documents into a plurality of chunks. The program instructions are executable by a computer system to embed the chunks and converting the chunks into numerical vector representations. The program instructions are executable by a computer system to perform a similarity check by comparing the vectors of the embedded chunks with vectors of existing chunks stored in the vector database. The program instructions are executable by a computer system to store the embedded chunks in the vector database if no similarity is identified between the vectors of the embedded chunks and the vectors of existing chunks stored in the vector database. As a result, the illustrative embodiments provide a technical effect of improving the accuracy of the data in the vector database by storing documents that are not similar, thus reducing the likelihood of storing conflicting information from similar documents in the vector database.

In the illustrative embodiments, the program instructions are executable by a computer system to initiate a conflict detection check if a similarity is identified. The program instructions are executable by a computer system to store the embedded chunks in the vector database if no conflict is identified. As a result, the illustrative embodiments provide a technical effect of improving the accuracy of data stored in the vector database by storing documents that do not have conflicting information.

In the illustrative embodiments, the program instructions are further executable by the computer system to initiate a conflict resolution if a conflict is identified. As a result, the illustrative embodiments provide a technical effect of improving the accuracy of data stored in the vector database by resolving or verifying any conflicting information based on a conflict resolution before data is stored in the vector database.

In the illustrative embodiments, the program instructions are further executable by the computer system to extract event information from text within the chunks and generate event knowledge graphs and extract structure and elements from images and tables within the chunks and generate structure graphs. The program instructions are further executable by the computer system to analyze the event knowledge graphs and structure graphs to detect a conflict. As a result, the illustrative embodiments provide a technical effect of conflict detection by analyzing the event knowledge graphs and structure graphs.

In the illustrative embodiments, the program instructions are further executable by the computer system to analyze the event knowledge graphs and structure graphs using a large language model (LLM). As a result, the illustrative embodiments provide a technical effect of conflict detection using an LLM.

In the illustrative embodiments, the program instructions are further executable by the computer system to store the embedded chunks in the vector database if no conflict is identified by the LLM. As a result, the illustrative embodiments provide a technical effect of reducing conflicts and discrepancies in the data in the vector database using an AI-trained model.

In the illustrative embodiments, the program instructions are further executable by the computer system to perform the similarity check based on a similarity measure between the vectors of the embedded chunks and the existing vectors in the vector database. As a result, the illustrative embodiments provide a technical effect of performing the similarity check based on a similarity measure to improve the accuracy of data stored in the vector database.

In the illustrative embodiments the vector database is a storage unit. As a result, the illustrative embodiments provide a technical effect of improving the accuracy of data stored in a storage unit.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one or more storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

With reference now to the figures, and in particular with reference to FIG. 1, a block diagram of a computing environment is depicted in accordance with an illustrative embodiment. Computing environment 100 contains an example of an environment for the execution of at least some of the computer code involved in performing the inventive methods, such as conflicts detection engine 190. In addition to conflicts detection engine 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and conflicts detection engine 190, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions and associated data are accessed by processor set 110 to control and direct performance of the inventive methods. In computing environment 100, at least some of the instructions for performing the inventive methods may be stored in conflicts detection engine 190 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, volatile memory 112 is located in a single package and is internal to computer 101, but, alternatively or additionally, volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in conflicts detection engine 190 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as a thin client, heavy client, mainframe computer, desktop computer, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data application portability between the multiple constituent clouds. In this embodiment, public cloud 105 and private cloud 106 are both part of a larger hybrid cloud.

Cloud Computing Services and/or Microservices: Public cloud 105 and private cloud 106 are programmed and configured to deliver cloud computing services and/or microservices (not separately shown in FIG. 1). Unless otherwise indicated, the word “microservices” shall be interpreted as inclusive of larger “services” regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider’s systems, and back. In some embodiments, cloud services may be configured and orchestrated according to an “as a service” technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
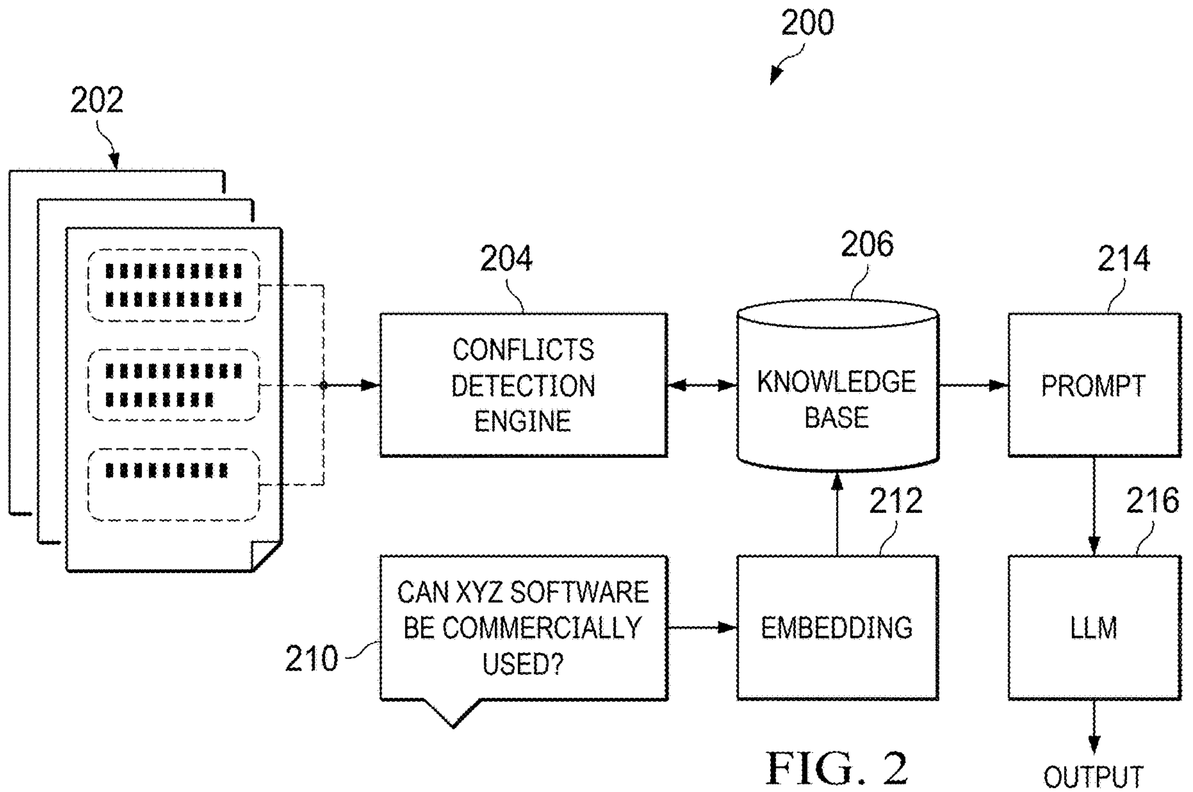
FIGS. 2-4 illustrate systems in accordance with illustrative embodiments.

FIG. 2 illustrates system 200 in accordance with an illustrative embodiment. System 200 shows components and sequence of data flow between the components.

In accordance with the illustrative embodiment, incoming new information is broken down into chunks 202 (e.g., a segment of an original document) to facilitate processing. This new information may include a variety of data formats, such as text documents (e.g., Word documents and PDF), tabular data (e.g., spreadsheets or structured tables) and visual contents (e.g., images and diagrams). Chunks 202 (representing new information) are embedded and converted into vectors (numerical representations). These vectors capture semantic meaning, allowing for comparisons based on content of chunks 202.

Chunks 202 are then pre-processed by conflict detection engine 204. Chunks 202 are compared against existing chunks in vector database 206 (also referred to as knowledge base). This comparison can be carried out using a similarity measure, which calculates the closeness of the vectors. In some example embodiments, the similarity is computed using measures such as cosine similarity, Euclidean distance or other metrics suited for vector comparisons.

Vector database 206 can, for example, be a storage device (e.g., storage 124) that is capable of storing information, such as, for example, without limitation, at least one of data, program code in functional form, or other suitable information either on a temporary basis, a permanent basis, or both on a temporary basis and a permanent basis.

If conflict detection engine 204 finds no similarities between chunks 202 and the existing chunks in vector database 206, it determines that there is no conflict and as a result, chunks 202 may be stored in vector database 206.

If conflict detection engine 204 identifies similarities between chunks 202 and the existing chunks in vector database 206, it determines that one or more conflicts may exist. In some example embodiments, conflict detection engine 204 does not solely rely on exact matches to identify similarities but may rely on partial matches. Exact matches may show vectors that are very close to each other (e.g., nearly identical) while partial matches may show vectors that are near each other but not identical. Conflict detection engine 204 follows a series of steps to resolve conflicts before updating vector database 206. The steps for conflict resolution are described with references to FIGS. 3-8.

When a user asks question 210, system 200 embeds 212 question 210 by converting question 210 into a numerical vector representation. System 200 compares the vector of the user’s question to the vectors of the existing chunks in vector database 206. In an example embodiment, the comparison is based on a similarity measure, which calculates how close the vectors are in the embedding space. Chunks with the highest similarity are considered the most relevant. System 200 retrieves relevant chunks from vector database 206. The retrieved chunks are provided as prompt 214 (e.g., context) to large language model (LLM) 216. In some example embodiments, LLM 216 is an artificial intelligence (AI) model that is trained on large amounts of data. LLM 216 is designed to perform tasks such as answering questions, summarizing text and generating creative content. In response to prompt 214, LLM 216 generates an output, which can be a coherent, detailed answer.

In an illustrative embodiment, various components of system 200 can be implemented in computing environment 100. At least some of the instructions for performing the inventive methods and steps described with reference to FIG. 2 may be stored in conflicts detection engine 190 in persistent storage 113, in storage 124 and/or in other storage devices that can retain and store instructions for use by a computer processor such as processor set 110.

Figure 3:
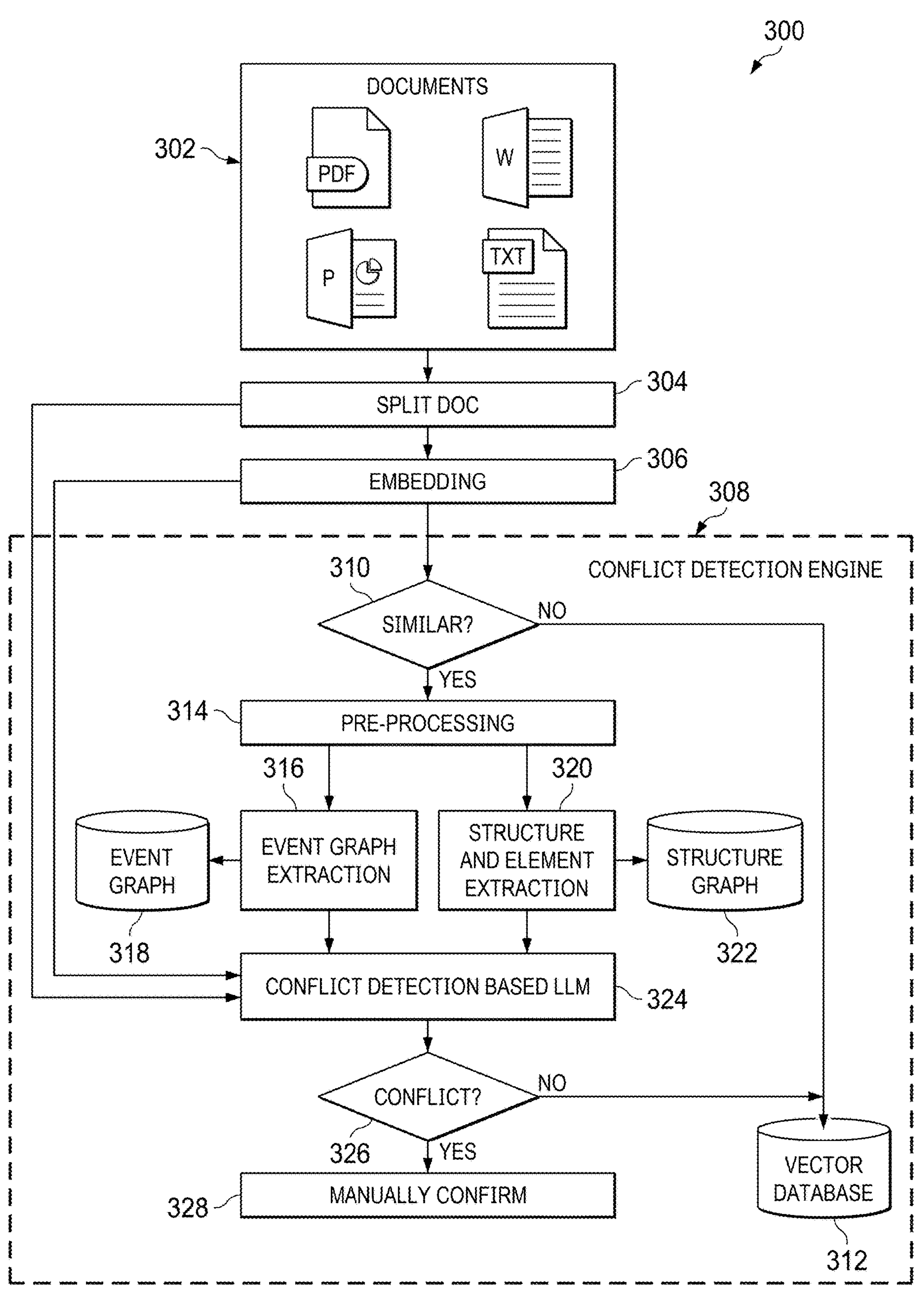

FIG. 3 illustrates system 300 in accordance with an illustrative embodiment. System 300 is configured to perform conflicts check prior to storing incoming new information in a vector database. The new information can, for example, include documents 302 (e.g., electronic documents including Word documents, PDF, power point, tables, etc.). First, documents 302 are split into chunks 304. For example, documents 302 can be broken down into smaller, manageable chunks 304 by a document processing module (not shown in FIG. 3). Next, chunks 304 are converted into embedded chunks 306 (e.g., numerical vector representations). An embedding model (not shown in FIG. 3) can be used to convert chunks 304 into embedded chunks 306.

Next, conflict detection engine 308 performs a similarity check 310 by comparing the vectors of embedded chunks 306 to the vectors of existing chunks in vector database 312. In an example embodiment, the comparison is based on a similarity measure, which calculates how close the vectors are in the embedding space.

If conflict detection engine 308 finds no similarities between embedded chunks 306 and the existing chunks in vector database 312, it determines that there is no conflict and as a result, the embedded chunks are stored in vector database 312. If conflict detection engine 308 identifies similarities between the embedded chunks and the existing chunks in vector database 312, it determines that one or more conflicts may exist. Conflict detection engine 308 pre-processes the embedded chunks using, for example, pre-processing module 314. In an illustrative embodiment, pre-processing includes: (1) extracting contents 316 from text and generating event graphs 318; and (2) extracting structure and elements 320 from images and tables and generating structure graphs 322.

These event graphs and structure graphs are provided as inputs to LLM 324. LLM 324 is a trained model which is designed for conflict detection. LLM 324 analyzes the event graphs and structure graphs to detect conflicts. If LLM 324 finds no conflicts at step 326, the chunks are stored in vector database 312. However, if conflicts are detected at step 326, the chunks undergo evaluation (e.g., manual evaluation 328) for conflict resolution. A human expert can review the discrepancies and decide how to resolve the conflict (e.g., by correcting one of the chunks or merging the data). This approach improves the accuracy of data stored in vector database 312 by ensuring that any conflicting information is either resolved or verified before it is stored in vector database 312.

In an illustrative embodiment, various components of system 300 can be implemented in computing environment 100. At least some of the instructions for performing the inventive methods and steps described with reference to FIG. 3 may be stored in conflicts detection engine 190 in persistent storage 113, in storage 124 and/or in other storage devices that can retain and store instructions for use by a computer processor such as processor set 110.

Figure 4:
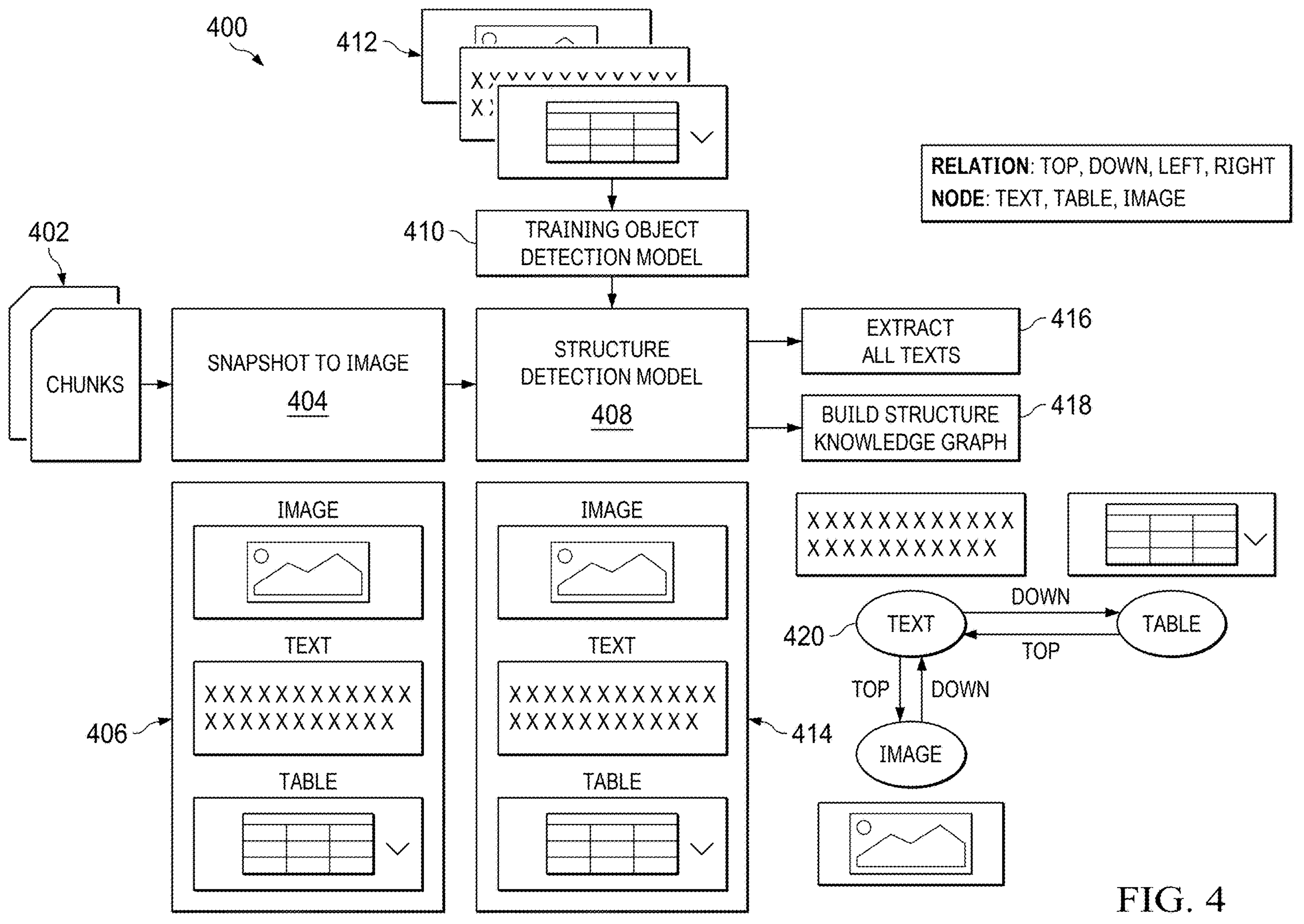

FIG. 4 depicts process 400 in accordance with an illustrative embodiment. Process 400 may be implemented by pre-processing module 314 shown in FIG. 3. Process 400 creates knowledge graphs from chunks.

First, source documents are divided into chunks 402. These chunks 402 are then converted into images 404. This may involve rendering the text as visual content or creating a visual representation of tables and figures from documents. Each chunk can be transformed into an image, such as image 406.

Next, structure detection model 408 is applied to recognize and classify various content types within images 404. For instance, structure detection model 408 can identify whether a section of an image (e.g., image 414) contains real-life photos, textual data, or tabular information. The structure detection model utilizes training object model 410 which can be developed using labeled datasets 412 (training sets). Structure detection model 408 extracts texts 416 from the images and constructs knowledge graph 418. Knowledge graph 418 includes nodes (e.g., text, table, image) and relationships (e.g., top, down, left, right) among the nodes. For example, the structure detection model can create knowledge graph 420 which shows nodes and relationships.

In an illustrative embodiment, at least some of the instructions for performing the inventive methods and steps described with reference to FIG. 4 may be stored in conflicts detection engine 190 in persistent storage 113, in storage 124 and/or in other storage devices that can retain and store instructions for use by a computer processor such as processor set 110.

Figure 5:
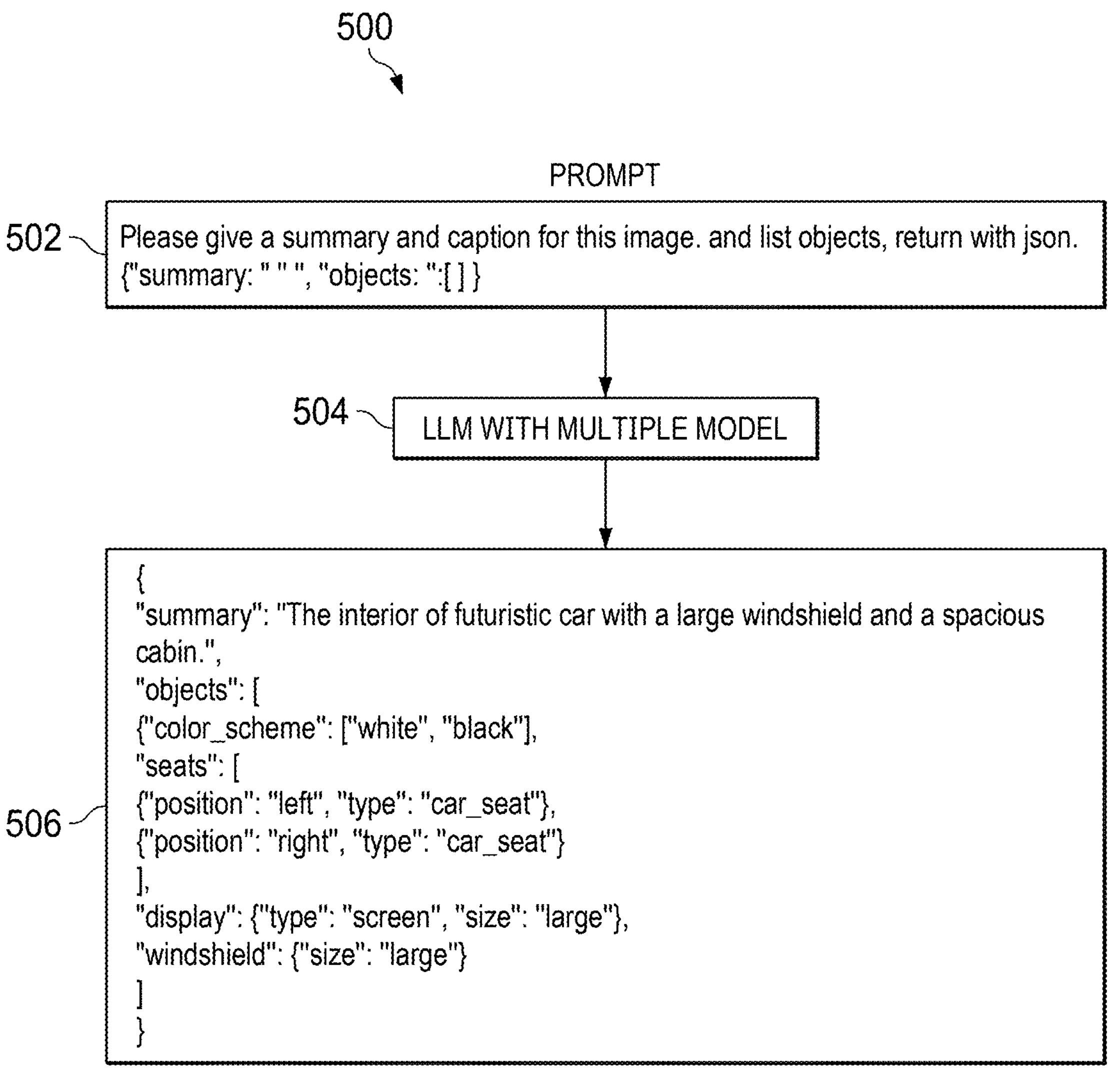
FIGS. 5-7 depict flow of processes in accordance with illustrative embodiments.

FIG. 5 illustrates process 500 in accordance with an illustrative embodiment. Process 500 analyzes images and provides a description of the images. The process begins with a large visual model (LVM), which analyzes an image and generates prompt 502. The LVM (not shown in FIG. 5) is a trained model capable of interpreting objects, scenes and other elements in the image to create a prompt that captures the essence of the image. The prompt is a textual representation or question derived from the image content.

In response to prompt 502, LLM 504 provides description 506 of an image. As an example, in response to a prompt "Please provide a summary and caption for this image and list objects", LLM 504 may generate description 506 which describes a futuristic car.

Figure 6:
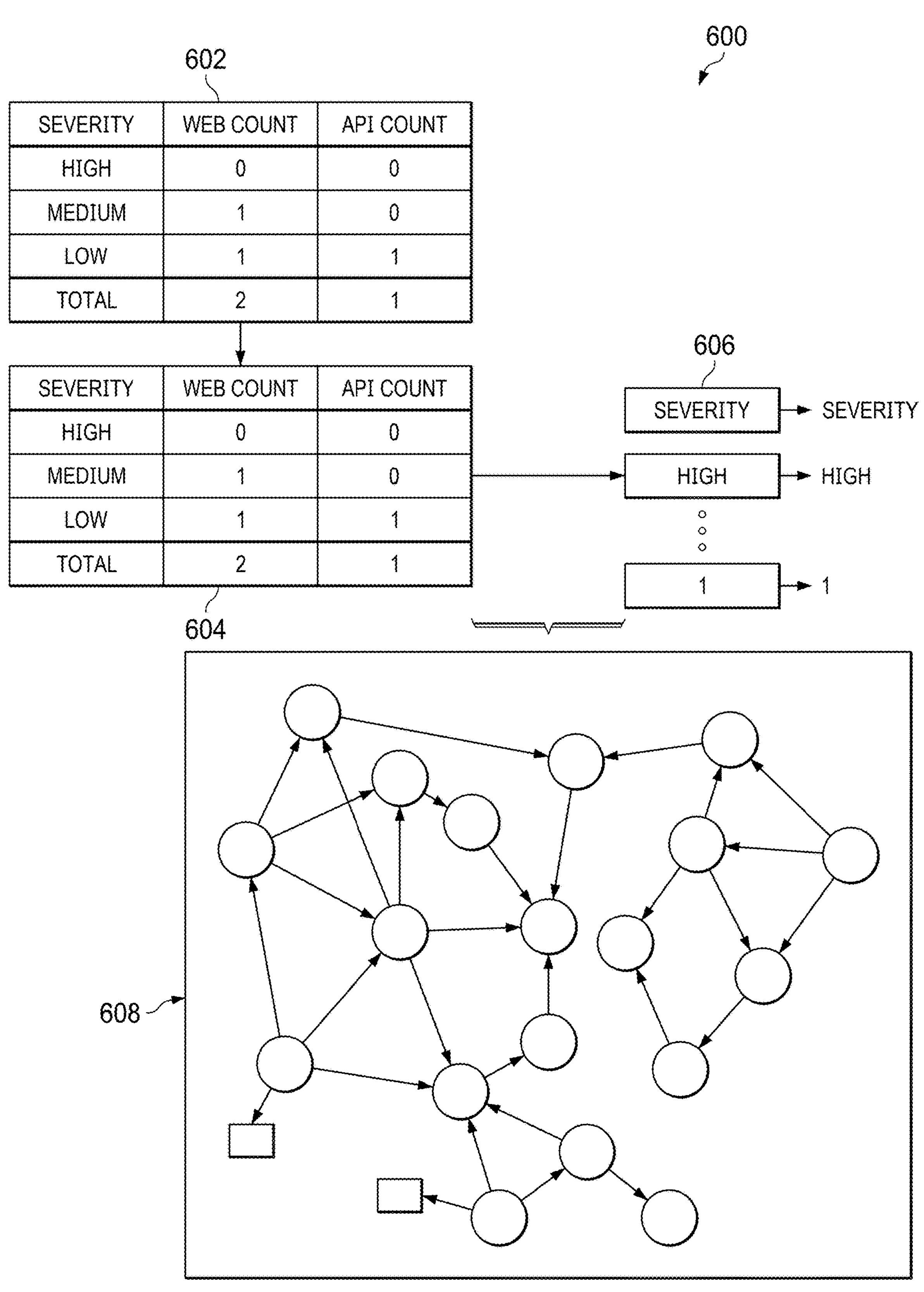

FIG. 6 illustrates process 600 in accordance with an illustrative embodiment. Process 600 generates a table graph by extracting contents of a table. The process starts with table 602, which is segmented into smaller sections or cells, resulting in segmented table 604. Segmentation involves identifying and isolating cells, rows, columns and other structural elements of table 602. Once the table is segmented, contents 606 (also referred to as elements) of the segments are extracted using, for example, optical character recognition (OCR) or other extraction tools. After extracting contents 606, table graph 608 is generated to represent the data structure and relationships within the table. In the illustrative embodiment, table graph 608 includes nodes which represent individual data points and edges which represent relationships (e.g., top, down, left, right) between these data points.

Figure 7:
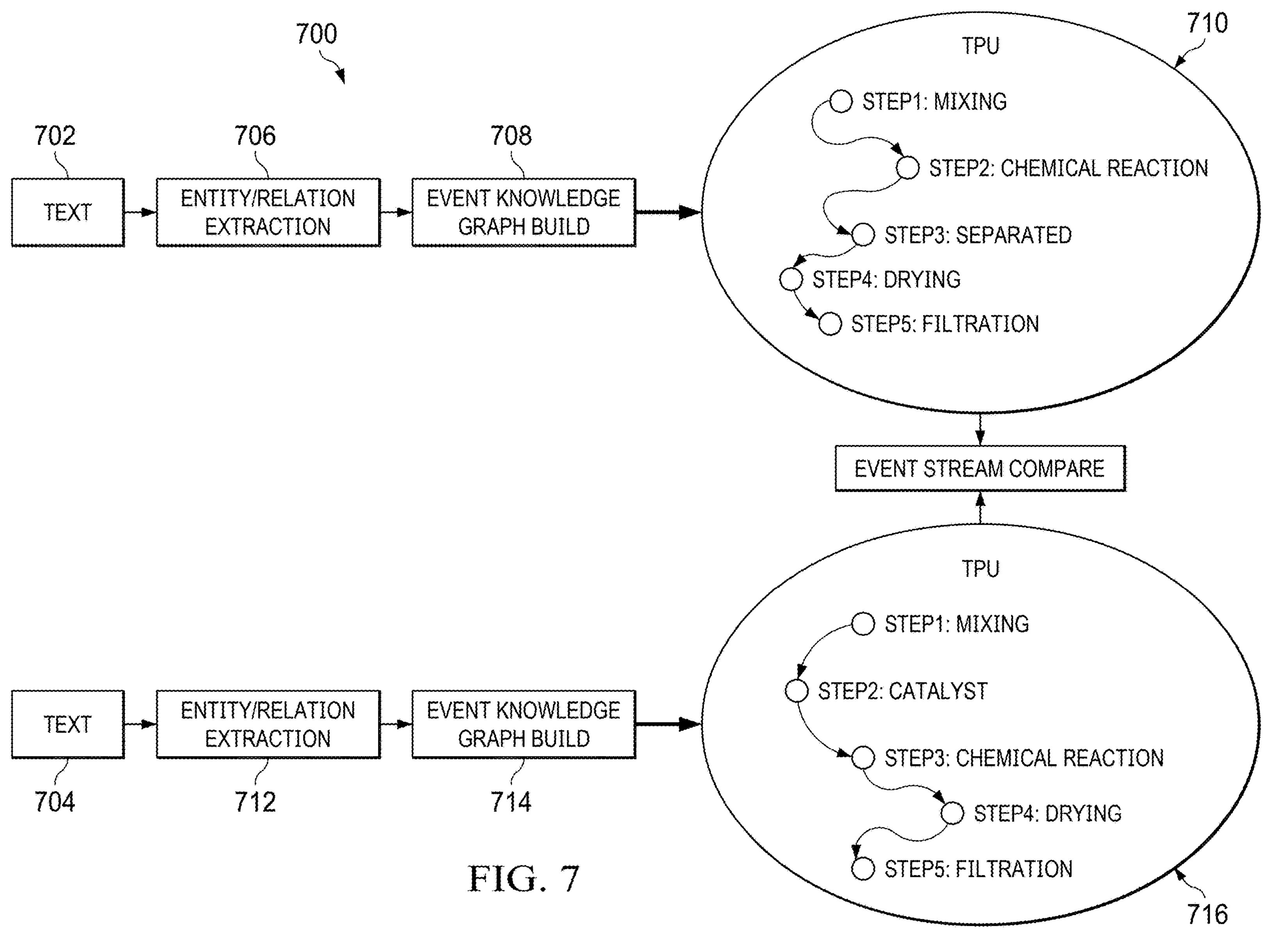

FIG. 7 illustrates process 700 in accordance with an illustrative embodiment. Process 700 analyzes text sources describing events or processes (e.g., chemical process) and generates event knowledge graphs. In this example, text 702 and 704 both contain descriptions of a chemical process. At block 706, entities (e.g., important terms, objects or steps) and relationships (e.g., connections between entities, objects or steps) are extracted from text 702. After extracting entities and relationships from the text, event knowledge graph 708 is created. The event knowledge graph is a structured visualization, showing entities as nodes and relationships as edges that connect them. An example event knowledge graph 710 extracted from text 702 shows entities (e.g., steps of a chemical process) and their relationships (e.g., sequence in which steps are performed). Similarly, entities and relationships from text 704 are extracted at block 712 and event knowledge graph 714 is created. An example event knowledge graph 716 extracted from text 704 is shown.

Figure 8:
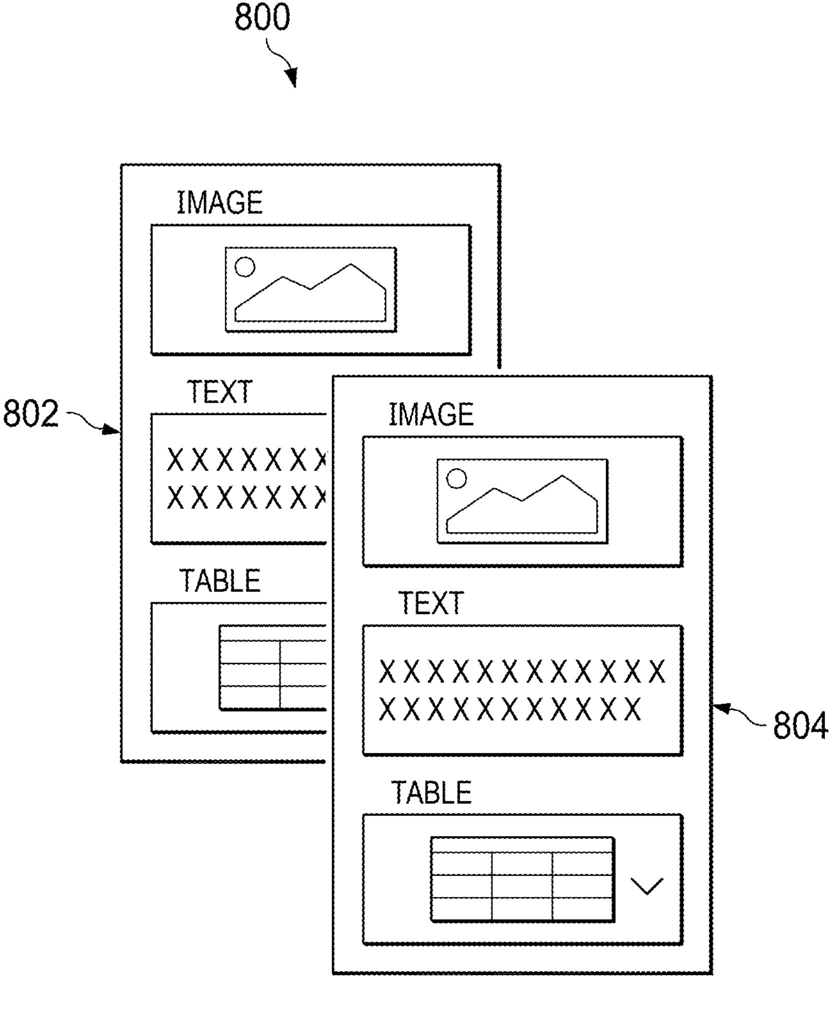
FIG. 8 illustrates conflicts detection in accordance with illustrative embodiments.

FIG. 8 illustrates conflicts detection 800 by comparing chunks 802 and 804. Conflicts detection 800 involves comparing two chunks of information, chunk 802 and chunk 804), to identify any discrepancies, overlaps or contradictions between them. By identifying conflicts, consistency and accuracy is ensured within the vector database (e.g., vector database 312).

In the illustrative embodiment, contents of chunks 802 and 804 are compared by comparing their respective image contents, table graphs and event knowledge graphs. For example, image contents can be extracted using process 500 (shown in FIG. 5), table graphs can be extracted using process 600 (shown in FIG. 6) and event knowledge graphs can be extracted using process 700 (shown in FIG. 7). In this example, extracted contents from the images, table graphs and event knowledge graphs are as follows:

Chunk 802:

Table Graph: {cell 1: 20, cell 2: 21 cell 3: 21}

Image Content: the image describes a process for digging a hole which should be less than 20 meters.

Event Knowledge Graph: the depth should be larger than 20 meters.

Chunk 804:

Table Graph: {cell 1: 2:20, cell 2: 15 cell 3: 15}

Image Content: the image describes a process for digging a hole which should be less than 20 meters.

Event Knowledge Graph: the depth should be less than 20 meters.

The table graph from chunk 802 is compared to the table graph from chunk 804, the image content from chunk 802 is compared to the image content from chunk 804, and the event knowledge graph from chunk 802 is compared to the event knowledge graph from chunk 804 to identify any discrepancies, overlaps or contradictions between them. Based on the comparison, the system determines the following the discrepancies or contradictions: (1) the value (21) of cell 2 of chunk 802 is different than the value (15) of cell 2 of chunk 804; and (2) the text content of chunk 1 (depth should be larger than 20 meters) is different than the text content of chunk 2 (depth should be less than 20 meters). As such, the system detects conflicts between chunks 802 and 804.

Since conflicts are detected between chunks 802 and 804, the chunks undergo evaluation for conflict resolution (shown in FIG. 3). In some example embodiments, a human expert can review the discrepancies and decide how to resolve the conflicts (e.g., by correcting one of the chunks or merging the data).

One of the main challenges in maintaining a RAG-based system is keeping the vector database updated and resolving conflicting information. As information constantly changes, conflicts between chunks retrieved from different sources or updates may occur, leading to erroneous or inconsistent Q&A results. These conflicts are difficult to resolve in cases where time stamps for the documents are unavailable or missing. The illustrative embodiments improve the accuracy of data stored in the vector database by ensuring that any conflicting information is either resolved or verified before it is stored in the vector database.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for conflict detection and data storage in a vector database, comprising:

receiving documents and splitting the documents into a plurality of chunks;

embedding the chunks and converting the chunks into numerical vector representations;

performing a similarity check by comparing the vectors of the embedded chunks with vectors of existing chunks stored in the vector database; and storing the embedded chunks in the vector database responsive to a determination that no similarity is identified between the vectors of the embedded chunks and the vectors of existing chunks stored in the vector database.

2. The computer-implemented method of claim 1, further comprising:

initiating a conflict detection check responsive to a determination that a similarity is identified; and storing the embedded chunks in the vector database responsive to a determination that no conflict is identified.

3. The computer-implemented method of claim 2, further comprising initiating a conflict resolution responsive to a determination that a conflict is identified.

4. The computer-implemented method of claim 2, wherein the conflict detection check comprises:

extracting event information from text within the embedded chunks and generating event knowledge graphs;

extracting structure and elements from images and tables within the embedded chunks and generating structure graphs; and analyzing the event knowledge graphs and structure graphs for conflict detection.

5. The computer-implemented method of claim 4, wherein the event knowledge graphs and structure graphs are analyzed using a large language model (LLM).

6. The computer-implemented method of claim 5, further comprising storing the embedded chunks in the vector database responsive to a determination that no conflict is identified by the LLM.

7. A computer system comprising:

a processor set;

one or more computer-readable storage media; and program instructions stored on the one or more storage media to cause the processor set to perform operations comprising:

receiving documents and splitting the documents into a plurality of chunks;

embedding the chunks and converting the chunks into numerical vector representations;

performing a similarity check by comparing the vectors of the embedded chunks with vectors of existing chunks stored in a vector database; and storing the embedded chunks in the vector database responsive to a determination that no similarity is identified between the vectors of the embedded chunks and the vectors of existing chunks stored in the vector database.

8. The computer system of claim 7, wherein the operations further comprise:

initiating a conflict detection check responsive to a determination that a similarity is identified; and storing the embedded chunks in the vector database responsive to a determination that no conflict is identified.

9. The computer system of claim 8, wherein the operations further comprise initiating a conflict resolution responsive to a determination that a conflict is identified.

10. The computer system of claim 7, wherein the operations further comprise:

pre-processing the embedded chunks and generating event knowledge graphs from text and structure graphs from images or tables; and analyzing the event knowledge graphs and structure graphs to detect conflicts.

11. The computer system of claim 10, wherein the operations further comprise analyzing the event knowledge graphs and structure graphs using a large language model (LLM).

12. The computer system of claim 11, wherein the operations further comprise storing the embedded chunks in the vector database responsive to a determination that no conflict is identified by the LLM.

13. A computer program product comprising:

one or more computer-readable storage media;

program instructions stored on the one or more storage media to perform operations comprising:

receiving documents and splitting the documents into a plurality of chunks;

embedding the chunks by converting the chunks into numerical vector representations;

performing a similarity check by comparing the vectors of the embedded chunks with vectors of existing chunks stored in a vector database; and storing the embedded chunks in the vector database responsive to a determination that no similarity is identified between the vectors of the embedded chunks and the vectors of existing chunks stored in the vector database.

14. The computer program product of claim 13, wherein the operations further comprise:

initiating a conflict detection check responsive to a determination that a similarity is identified; and storing the embedded chunks in the vector database responsive to a determination that no conflict is identified.

15. The computer program product of claim 14, wherein the operations further comprise initiating a conflict resolution responsive to a determination that a conflict is identified.

16. The computer program product of claim 14, wherein the conflict detection check comprises:

extracting event information from text within the chunks and generating event knowledge graphs;

extracting structure and elements from images and tables within the chunks and generating structure graphs; and analyzing the event knowledge graphs and structure graphs to detect a conflict.

17. The computer program product of claim 16, wherein the event knowledge graphs and structure graphs are analyzed using a large language model (LLM).

18. The computer program product of claim 17, wherein the embedded chunks are stored in the vector database responsive to a determination that no conflict is identified by the LLM.

19. The computer program product of claim 13, wherein performing the similarity check comprises determining a similarity measure between the vectors of the embedded chunks and the existing vectors in the vector database.

20. The computer program product of claim 13, wherein the vector database is a storage unit.

* * * * *